United States Patent [19]

Tyler et al.

[11] 4,110,228

[45] Aug. 29, 1978

[54] SALINITY TOLERANT SURFACTANT OIL RECOVERY PROCESS

[75] Inventors: Timothy N. Tyler, Houston, Tex.; Melvin E. Mills, Jr., Salem, Ill.; John A. Wells; Joseph T. Carlin, both of Houston, Tex.

[73] Assignee: Texaco Inc., New York, N.Y.

[21] Appl. No.: 746,643

[22] Filed: Dec. 1, 1976

[51] Int. Cl.$^2$ ............................................. E21B 43/22
[52] U.S. Cl. ............................... 252/8.55 D; 166/273; 166/275
[58] Field of Search ................... 252/8.55 D; 166/273, 166/274, 275

[56] References Cited

U.S. PATENT DOCUMENTS

| | | | |
|---|---|---|---|
| 3,467,190 | 9/1969 | Dunlap et al. ................. | 166/274 X |
| 3,508,612 | 4/1970 | Reisberg ....................... | 252/8.55 X |
| 3,811,507 | 5/1974 | Flournoy et al. ............... | 252/8.55 X |
| 3,858,656 | 1/1975 | Flournoy et al. ............... | 166/274 |
| 3,890,239 | 6/1975 | Dycus et al. .................. | 252/8.55 |
| 3,939,911 | 2/1976 | Maddox et al. ................. | 166/274 |
| 4,013,569 | 3/1977 | Chiu et al. .................... | 252/8.55 |

OTHER PUBLICATIONS

Kirk–Othmer, Encyclopedia of Chemical Technology, second edition, vol. 19, 1969, pp. 507–509.

*Primary Examiner*—Herbert B. Guynn
*Attorney, Agent, or Firm*—Carl G. Ries; Thomas H. Whaley; Jack H. Park

[57] ABSTRACT

Primary anionic surfactants such as organic sulfonates, specifically petroleum sulfonates as well as synthetic alkyl or alkylaryl sulfonates are effective for recovering oil from subterranean, oil-containing formations only if the salinity and/or concentration of divalent ions in the formation water is relatively low. Many petroleum formations contain water whose salinity is in excess of the tolerance level of organic sulfonates, and either the high salinity water must be displaced by a preflush or the primary anionic organic sulfonate surfactants must be used in conjunction with an effective solubilizing co-surfactant in order to increase the solubility of the organic sulfonate in the high salinity and/or hard water. Suitable solubilizing co-surfactants include ethoxylated alcohols, alkyl phenols, and alkyl or alkylaryl thiols, as well as sulfated or sulfonated, ethoxylated alcohols or alkyl phenols. Optimum performance in any particular field is achieved if the ratio of primary anionic surfactant to solubilizing co-surfactant is carefully chosen so the surfactant combination exhibits borderline solubility in the particular formation water in which the surfactants are to be employed. The concentration ratio of primary and solubilizing surfactants which results in the desired borderline solubility may be identified by preparing a number of samples in the formation water using different ratios of primary surfactant concentration to solubilizing co-surfactant concentration, measuring the electrical conductivity of the samples and choosing the concentration ratio corresponding to the sample which produced the minimum electrical conductivity, or at which point the conductivity vs. concentration ratio curve exhibited an inflection point.

7 Claims, 2 Drawing Figures

SALINITY TOLERANT SURFACTANT OIL RECOVERY PROCESS

BACKGROUND OF THE INVENTION

1. Field of the Invention

This invention concerns an oil recovery process and more specifically, a surfactant oil recovery process. Still more specifically, this invention is concerned with an oil recovery process usable in subterranean oil formations containing abnormally high salinities and/or concentrations of divalent ions such as calcium and magnesium by the use of a primary anionic surfactant and a solubilizing co-surfactant in a critical ratio.

2. Description of the Prior Art

Petroleum is normally recovered from subterranean formations in which it has accumulated by penetrating the formation with one or more wells and pumping or permitting the petroleum to flow to the surface through these wells. Recovery of petroleum from formations is possible only if certain conditions exist in the formation. The petroleum must be present in the formation in an adequately high concentration, and there must be sufficient permeability or interconnected flow channels within the formation to permit the flow of fluids therethrough if sufficient pressure is applied to the fluids. When the formation has natural energy present in the form of an underlying active water drive, or gas dissolved in the petroleum which can exert pressure to drive the petroleum to the producing well, or a high pressure gas cap above the petroleum saturated portion of the formation, this natural energy may be utilized to recovery petroleum. Recovery of petroleum by use of natural energy as described above is referred to as primary recovery. When this natural energy source is depleted, or in those instances where the formation does not contain sufficient natural energy to support primary recovery, some form of supplemental or enhanced recovery process must be applied to the formation in order to extract petroleum therefrom. Supplemental recovery is sometimes referred to in the art as secondary or tertiary recovery, although in fact it may be primary, secondary or tertiary in sequence of employment.

Water flooding, which involves the injection of water into the subterranean, petroliferous formation for the purpose of displacing petroleum toward the producing well, is the most economical and widely practiced supplemental recovery method. Water does not displace petroleum with high efficiency, however, since water and oil are immiscible, and also because the interfacial tension between water and oil is quite high. Persons skilled in the art of oil recovery have recognized this inherent weakness in water flooding and many additives have been described in the literature for decreasing the interfacial tension between the injected water and the formation petroleum. For example, U.S. Pat. No. 2,233,381 (1941) discloses the use of polyglycol ethers as surface active agents or surfactants to increase the capillary displacement efficiency of an aqueous flooding medium. U.S. Pat. No. 3,302,713 discloses the use of petroleum sulfonates prepared from a specific boiling range fraction of the petroleum feed stock for a surfactant in oil recovery operation. Other surfactants which have been proposed for oil recovery operations include alkylpyridinium salts, alkyl sulfates, alkylaryl sulfates, ethoxylated alkyl or alkyaryl sulfates, alkyl sulfonates, alkylaryl sulfonates, and quaternary ammonium salts.

The above described surfactants are satisfactory in some formations, particularly wherein the salinity as well as concentration of divalent ions in the formation water is relatively low. Generally, the salinity must be less than about 1,000 parts per million and the concentration of divalent ions must be less than about 200 to about 500 parts per million in order to permit the use of the most commonly available primary anionic surfactants such as petroleum sulfonate.

Persons skilled in the art have recognized the limitation of simple anionic surfactants such as petroleum sulfonate and have described the use of certain solubilizing co-surfactants therewith. U.S. Pat. Nos. 3,811,504; 3,811,505; and 3,811,507 describe certain mixtures of alkyl or alkylaryl sulfonates and nonionic surfactants which exhibit satisfactory performance in petroleum formations having high salinity and/or hard water. U.S. Pat. No. 3,508,612 (1970) describes the use of a dual surfactant system comprising an organic sulfonate such as a petroleum sulfonate and a sulfated, ethoxylated primary or secondary alcohol, which is compatible with high salinity and/or high divalent ion containing formation waters. U.S. Pat. Nos. 3,827,497 and 3,890,239 relate to oil recovery fluids and processes which are compatible with high salinity formation waters and involve organic sulfonate and sulfonated, ethoxylated alcohol mixtures.

While the aforementioned multi-component systems can be rendered soluble in high salinity and/or high divalent ion concentration formation waters, their use has not always been satisfactory because the ratio of the concentrations of the primary anionic surfactant and the solubilizing co-surfactant are extremely critical and vary with the salinity, divalent ion concentration, as well as with the specific surfactant composition being employed. If too little solubilizing surfactant is used, the primary anionic surfactant precipitates in the presence of the high salinity water. If too much solubilizing surfactant is used, the material is rendered so soluble in water that its effectiveness for purpose of reducing the interfacial tension between the drive water and the formation petroleum is greatly reduced. In either case, oil recovery falls off sharply. Moreover, the cost of the solubilizing co-surfactant is generally two to five times as great as the cost per pound of the primary anionic surfactant, and the use of excessive amounts of solubilizing co-surfactant renders an oil recovery process economically unattractive.

U.S. Pat. No. 3,916,997 (1975) describes the use of an oil-external micellar dispersion wherein the concentration of surfactant and alcohol used as a solubilizer are varied to produce a fluid having an electrical conductivity above a specified value.

In view of the foregoing discussion, it can be appreciated that there is a substantial unfulfilled commercial need for an efficient and economical petroleum recovery method applicable to formations containing high salinity and/or high divalent ion concentration.

SUMMARY OF THE INVENTION

The present invention concerns a petroleum recovery process usable in formations containing water having high salinities, e.g. total dissolved solids in excess of 20,000 parts per million and/or high concentrations of divalent ions such as calcium and/or magnesium e.g. greater than about 1000 parts per million. The surfactant system comprises at least two surfactants;

(1) a primary anionic surfactant, generally an organic sulfonate such as petroleum sulfonate or a synthetic alkyl or alkylaryl sulfonate; and (2) a solubilizing co-surfactant which renders the primary anionic surfactant soluble in the particular high salinity and/or high divalent ion concentration formation water, which may be any one of the following surfactants or mixtures thereof.

(a) a nonionic surfactant such as an ethoxylated alcohol or an ethoxylated alkylaryl compound (b) a nonionic mercaptan related surfactant such as an ethoxylated alkyl or alkylaryl thiol;

(c) an alkyl or alkylaryl polyethoxy alkyl sulfonate compound having the following structure:

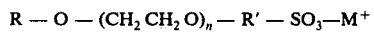

wherein R is an alkyl group, linear or branched, having from 8 to 22 carbon atoms, or an alkylaryl group having from 8 to 15 carbon atoms in the alkyl chain, $n$ is an integer from 2 to 12

R' is ethyl, propyl or hydroxypropyl, $SO_3$ represents the sulfonate radical, and $M^+$ is a monovalent cation such as sodium, potassium or ammonium; and (d) an alkyl or alkylaryl polyethoxyl sulfate surfactant having the following general structure:

wherein R, $n$ and $M^+$ have the same meaning as in (c) above, and $-OSO_3$ is a sulfate radical.

Among other factors, the choice of solubilizing co-surfactant is influenced by formation water salinity and hardness as well as by formation temperature.

The ratio of the concentrations of the anionic primary surfactant and the solubilizing co-surfactant is carefully chosen so the surfactants are slightly soluble or exhibit borderline solubility in the particular field water in which the surfactants are to be employed, which is preferably the same as the formation water present in the petroleum formation into which the surfactant fluid is to be injected. The concentrations of surfactants which produce the desired condition of borderline solubility are determined by preparing a series of at least four samples containing various concentrations of the two or more surfactants dissolved in actual samples of formation or field water to be employed in the field project, and measuring the electrical conductivity of the samples. At least one of the samples should contain insufficient quantity of solubilizing co-surfactant to render the primary anionic surfactant soluble in the test solution. The electrical conductivity may be plotted as a function of the weight ratio of solubilizing co-surfactant to primary surfactant, and the first occurrance on the electrical conductivity vs. concentration ratio curve having a minimum value and/or an inflection point is identified. The weight ratio corresponding to this first inflection and/or minimum point is the weight ratio which corresponds to borderline solubility of the multi-component surfactant composition in that particular brine and is the preferred concentration ratio to be employed in the oil recovery process.

DETAILED DESCRIPTION OF THE PREFERRED EMBODIMENTS

Figure 1A:
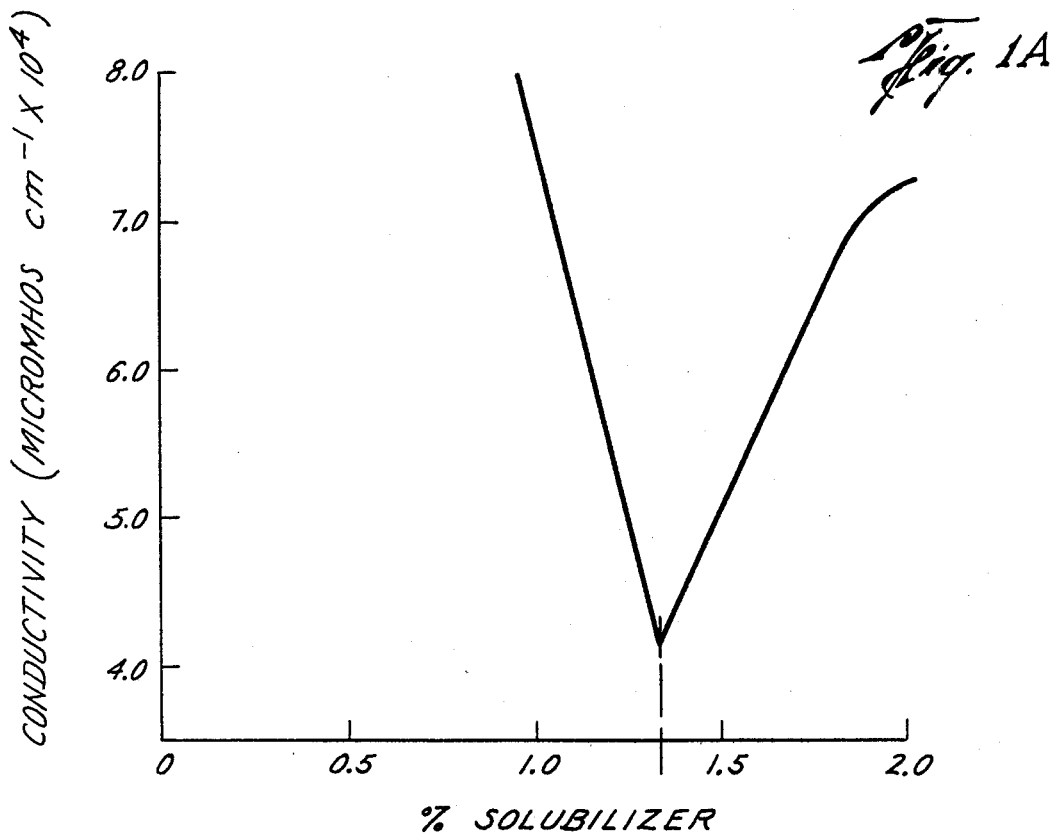
FIG. 1A illustrates the oil recovery obtained in a series of surfactant displacement tests conducted in formation cores employing various ratios of solubilizing co-surfactant to primary anionic organic sulfonate surfactant.

Our oil recovery process involves a carefully balanced multi-component surfactant system which will be comprised of the following types of surfactants:

(1) at least one primary anionic surfactant, preferably an organic sulfonate such as a petroleum sulfonate, or a synthetic alkyl or alkylaryl sulfonate; and (2) a solubilizing co-surfactant which may be comprised of one or more of the following types of compounds:

(a) a nonionic surfactant such as an ethoxylated alcohol or an ethoxylated alkylaryl compound, (b) a nonionic mercaptan-related surfactant such as an ethoxylated alkyl or alkylaryl thiol;

(c) an alkyl or alkylaryl polyethoxy alkyl sulfonate having the following structure:

wherein R is an alkyl group linear or branched having from 8 to 22 carbon atoms, or an alkylaryl group having from 8 to 15 carbon atoms in the alkyl chain.

$n$ is an integer from 2 to 12

R' is ethyl, propyl or hydroxypropyl, $SO_3$ represents the sulfonate radical, and $M^+$ is a monovalent cation such as sodium, potassium or ammonium; and (d) an alkyl or alkylaryl polyethoxyl sulfate surfactant having the following general structure:

wherein R, $n$ and $M^+$ have the same meaning as in (c) above, and $-OSO_3$ is a sulfate radical.

Petroleum sulfonate is a particularly desirable primary surfactant for oil recovery purposes because it is readily available, comparatively inexpensive and quite effective under ideal conditions for recovering petroleum from subterranean, petroleum-containing formations. Petroleum sulfonate is, unfortunately, insoluble in water having salinities greater than about 20,000 parts per million total dissolved solids, and/or more than about 200–500 parts per million divalent ions which are generally calcium and/or magnesium. If petroleum sulfonate is added to a brine having greater salinity and/or divalent ion concentration than the above-identified limits, the petroleum sulfonate is insoluble and will precipitate and ultimately settle out of the solution, forming a clearly delineatable layer under the aqueous solution. If such a fluid were injected into a subterranean, permeable oil formation, little or no interfacial tension reduction would be accomplished because the petroleum sulfonate is not soluble in the aqueous fluid in which it is injected; moreover, there is a considerable probability that plugging of at least some of the flow channels in the oil formation would occur because the precipitated petroleum sulfonate would block the small capillary flow channels. Accordingly, either a different surfactant must be utilized, which is soluble in the formation water in which the fluid is to be injected, or another material must be added to the surfactant fluid which will have the effect of increasing the solubility of the primary anionic surfactants, e.g. petroleum sulfonate or other organic sulfonate in the presence of the high salinity and divalent ion-containing formation water. Alcohols are sometimes employed for this purpose, although they have only limited effectiveness and, additionally, it is preferable to utilize a material which is itself a surface active agent and so is capable of reducing the interfacial tension between the formation petroleum and the injected drive water.

Any of the above-identified four general classes of solubilizing co-surfactants may be combined with organic sulfonates such as petroleum sulfonate, and when a proper ratio is achieved between the concentration of the organic sulfonate and the solubilizing co-surfactant, the organic sulfonate is rendered soluble in the presence of high salinity and/or high divalent ion-containing formation water and so can effectively reduce the interfacial tension between oil and water and thereby recover substantial amounts of oil from a formation through which the aqueous surfactant solution is passed.

The choice of solubilizing co-surfactant is influenced by the formation water salinity and divalent ion concentration and by the formation temperature. The ethoxylated alcohols and thiols are effective up to salinities of about 100,000 parts per million total dissolved solids and in formations whose temperatures are as high as 150° F. at high salinities. The alkyl or alkylaryl polyethoxy sulfates are effective in higher salinities, up to 100,000 parts per million, but hydrolyze in the presence of temperatures above about 150° F. and also exhibit phase instability under such conditions. The alkyl or alkylaryl polyethoxy alkyl sulfonates are tolerant of both very high salinities and high temperatures.

We have found that the degree of solubility of the surfactant composition in the field water is extremely critical to the oil recovery efficiency of the process. If the surfactant is much more soluble in water than oil, the surfactants tends to be distributed throughout the water phase including both formation water and injected drive water, and little effectiveness will be achieved at the interfacial zones between oil and water. Similarly, if the surfactant is substantially more soluble in oil than it is in water, the surfactant will partition into and distribute itself throughout the oil phase, and will have little effect on the surface tension existing at the interfacial zone between oil and water. The optimum surfactant effectiveness is achieved if there is a condition of borderline solubility of the surfactant fluid in the drive water and/or formation water, so the surfactants tend to exist in higher concentrations at the interfacial zone between oil and water than either do the oil phase or the water phase.

We have found that when using organic sulfonates such as petroleum sulfonates and a solubilizing co-surfactant such as those enumerated above, the optimum oil recovery efficiency occurs when the concentrations of the two materials are carefully balanced so as to produce a condition of borderline solubility. If too little solubilizing cosurfactant is used in combination with the primary anionic organic sulfonate, the primary surfactant is not rendered soluble and at least a portion thereof will precipitate in the aqueous solution. This can, as discussed above, result in at least reducing the effectiveness of the surfactant fluid for the purpose of recovering oil, and may lead to permanent, irreversible damage to permeability of the formation matrix, which will prevent any further displacement of petroleum from the formation. On the other hand, if more than the amount of solubilizing co-surfactant which achieves the condition which we have described above as borderline solubility is used in combination with the primary anionic organic sulfonate surfactant, the surfactant is rendered too soluble in the aqueous phase and the amount of oil displaced by such a solution being injected into a formation is reduced fairly substantially. Moreover, since the cost of the solubilizing co-surfactants is generally from two to five times the cost of the primary anionic organic sulfonate surfactant, the result of using too much solubilizing co-surfactant is that the fluid cost is increased in addition to the amount of oil recovered by the use of the fluid being decreased, which results in rapidly diminishing economic attractiveness of the process.

The amount of solubilizing co-surfactant necessary to achieve the above-described desired condition of borderline solubility is highly dependent on all of the possible variations in the structural characteristics of the surfactant molecules employed. The equivalent weight of the anionic primary organic sulfonate surfactant, for example, will affect the amount of solubilizing co-surfactant required to achieve the condition of borderline solubility. In the instance of using alkyl or alkylaryl polyethoxy sulfates or sulfonates as solubilizing co-surfactants, any change in the length of the alkyl chain which comprises the hydrophobe of the surfactant molecule, or a change in the number of ethoxy groups condensed with the molecule, will change the amount of that solubilizing co-surfactant needed to achieve the condition of borderline solubility with whatever primary anionic surfactant it is used. Furthermore, the aqueous fluid salinity and the concentration of divalent ions present in the fluid will also vary the amount of the surfactants needed to achieve borderline solubility. Generally, higher salinity and/or higher concentrations of divalent ions of the aqueous fluid in which the surfactants are dissolved require increasing numbers of ethylene oxide units to be present on the solubilizing co-surfactant molecule.

We have found that the only satisfactory method for determining the proper concentrations of primary anionic surfactant and solubilizing co-surfactant involves actually preparing a series of solutions containing the candidates for use in a particular application in various concentrations, and determining the ratio of anionic primary surfactant to solubilizing co-surfactant which produces the desired condition of borderline solubility in the particular environment of salinity and hardness in which the surfactants are to be employed in a surfactant flood. It is highly desirable that the surfactant fluid salinity and concentration of divalent ions match the salinity and divalent ion concentration of the formation water as closely as possible, so the surfactants can be tailored to operate in an optimum fashion in that particular aqueous environment.

As a starting point, at least 4 and preferably at least 6 different solutions should be prepared. If petroleum sulfonate is to be used, the concentration may be held constant at a value of about 1–2 percent and the concentration of solubilizing co-surfactant varied from 0.1 to 3.0 percent depending on the equivalent weight of the organic sulfonate used, and the nature of the solubilizer. Stated another way, the total concentrations should be between 1 and 5 percent and the weight ratio of solubilizing co-surfactant to primary surfactant should be between 0.1 and 4.0 and preferably less than 1.0. At least one of the samples should contain a quantity of solubilizing co-surfactant which is insufficient to render the primary anionic surfactant soluble in the test solution, with the other samples containing progressively larger quantities of solubilizing co-surfactant. This is necessary since the function of electrical conductivity versus concentration of solubilizing co-surfactant sometimes exhibits two distinct inflection points or minimums or an inflection point first followed by a minimum value which occurs at higher concentrations of solubilizing co-surfactant. The second minimum or inflection point is believed to be associated with formation or micelles and does not correspond to the condition of borderline solubility which we have found to produce the maximum oil recovery. Usually at least four samples will be required to define the slopes before and after the desired first inflection point or minimum. If the wrong concentrations are chosen initially, it will often be necessary to prepare and test additional samples. More than four samples may also be prepared initially to ensure properly identifying the desired first inflection point or minimum of conductivity versus concentration of solubilizing co-surfactant encountered adjacent the concentration of solubilizing co-surfactant which is ineffective for the purpose of solubilizing the primary organic sulfonate surfactant.

Having compared the series of surfactants in the formation water as described above, the ratio of solubilizing co-surfactant to primary anionic surfactant which results in the desired condition of borderline solubility is determined as follows. The samples are placed in a suitable cell and the conductivities of each of the samples are determined. The conductivity is then expressed as a function of the ratio of the concentration of two surfactants in some manner such as graphically, and the minimum or inflection point of the conductivity versus concentration function is determined. In some instances a sharp minimum value will be identified; whereas in other cases the conductivity function will exhibit a clearly identified inflection point, but will not necessarily change slope sign. The ratio of surfactants which result in the first minimum conductivity or in the occurrance of the first inflection point of the conductivity function, is the ratio which will produce the condition of borderline solubility in the aqueous surfactant fluid, and is also the ratio of surfactants which will achieve the optimum oil recovery in a formation containing water having the salinity and hardness similar to that utilized in the tests.

Once the optimum weight ratio is identified, a second series of oil recovery tests may be performed in which the weight ratio is held constant and the total concentration is varied to determine whether additional oil may be recovered using more or less surfactant. For example, if it is determined that the optimum ratio of solubilizing co-surfactant to primary surfactant for a particular application is 0.35 in a series of tests using 2.0 percent petroleum sulfonate and 0.7 percent solubilizing surfactant (2.7 percent total surfactant concentration), oil recovery efficiency may be measured for surfactant fluids containing 1.0, 1.5, 2.0 and 3.0 percent total surfactant at the same weight ratio to identify the total surfactant concentration which results in the maximum oil recovery.

Figure 1B:
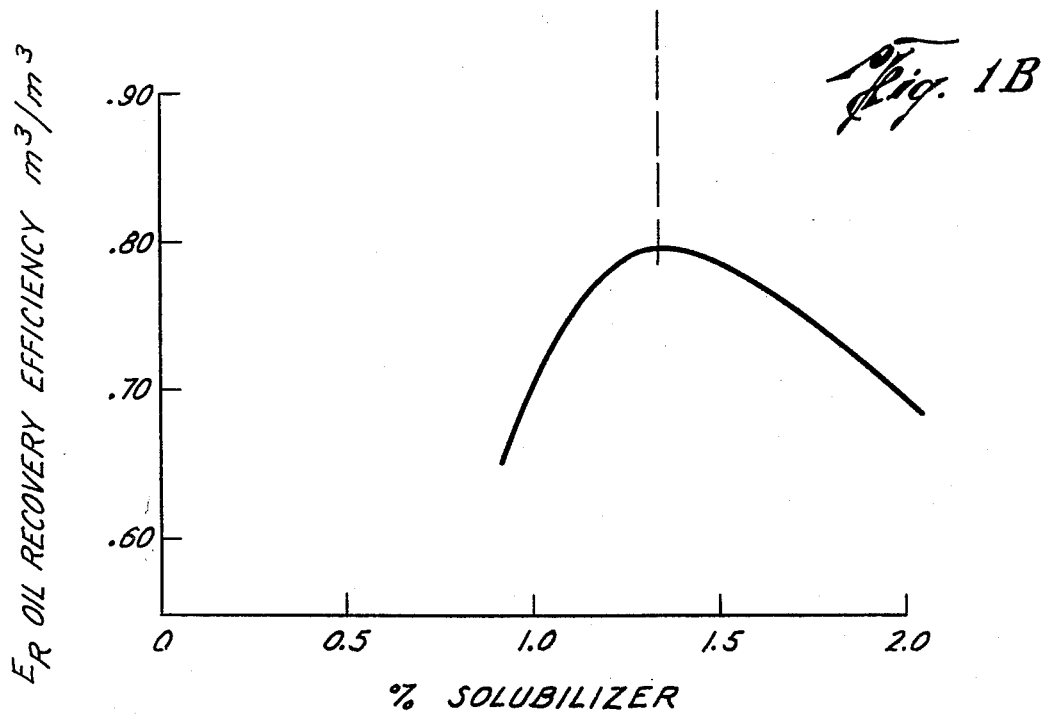
FIG. 1B illustrates the results of a series of tests in which electrical conductivities of solutions of the same solubilizing co-surfactant and primary anionic organic sulfonate surfactants as were tested for oil recovery efficiency for the test represented by FIG. 1A, were measured and are plotted as a function of the concentration ratios.

The procedures for identifying the ratio of primary anionic surfactant to solubilizing co-surfactant which produces the minimum or inflection point conductivity from which can be determined the concentration resulting in the borderline solubility needed for optimum oil recovery can best be understood by reference to the attached FIGS. 1A and 1B. FIG. 1A depicts the results of a series of conductivity measurements performed on a series of aqueous solutions containing petroleum sulfonate surfactant and a solubilizing co-surfactant.

The petroleum sulfonate utilized in all of the tests from which the curves of FIGS. 1A and 1B were derived was a commercially available sample of petroleum sulfonate obtained from Witco Chemical Company and identified by their trademark as TRS 10B, which has an equivalent weight of about 389. The solubilizing co-surfactant utilized in all of the tests was a sulfated, ethoxylated nonylphenol available commercially from GAF Corporation as Alipal CO-436. In all instances, the solution salinity was 130,000 parts per million total dissolved solids and the concentration of divalent ions (hardness) was 7600. A series of seven samples of the above-identified surfactants dissolved in formation water was prepared and the conductivity of each sample was determined. As can be seen from the curve of FIG. 1A, the electrical conductivity curve exhibited a sharp minimum value at a concentration of solubilizing co-surfactant of about 1.33 percent. In all of the solutions, the concentration of petroleum sulfonate was held constant at 2.0 percent. Thus the ratio of solubilizing co-surfactant to primary anionic surfactant which resulted in the minimum electrical conductivity was 1.332 or 0.665.

Several oil displacement tests were conducted in cores obtained from the same formation as produced the above-identified brine, and as can be seen from FIG. 1B. the maximum oil recovery efficiency was obtained using the same ratio of solubilizing co-surfactant to primary anionic surfactant (petroleum sulfonate) as resulted in the minimum value of electrical conductivity in FIG. 1A.

Once the ratio of solubilizing co-surfactant to primary anionic surfactant has been established, the optimum ratio will generally remain relatively constant even though the total concentration of the surfactants in the drive fluid is varied. The above ratio was established in a series of tests in which the concentration of the petroleum sulfonate was held constant and the solubilizer concentration varied. It may be that the total concentration of the two surfactants can be reduced without adversely affecting the oil recovery efficiency; or conversely, a slight increase in the total concentration can sometimes result in a significant increased oil recovery efficiency. This should be determined by performing several oil recovery displacement tests using cores and oil from the formation in which the oil recovery process is to be applied, and varying the total concentration over a reasonable range, usually from about 1.5 percent to about 3 percent by weight total surfactant concentration being preferred.

The optimum oil recovery results are obtained using surfactant concentrations producing the minimum conductivity as stated above. Usually, the electrical conductivity of an optimum fluid will be below about 7.0 and preferably below about 5.0 micromhoes $\times 10^{-4}$ centimeter$^{-1}$. Thus another embodiment of our invention is to identify a ratio of concentration of solubilizing co-surfactant to primary anionic surfactant which produces a solution whose electrical conductivity is at least below about 7.0 and preferably below about 5.0 micromhoes $\times 10^{-4}$ centimeter$^{-1}$, and utilize that ratio in a surfactant fluid for enhanced oil recovery.

Aother series of tests were performed along the same lines as those described above, using essentially the same petroleum sulfonate in the same salinity and divalent ion concentration field water as was used in the foregoing tests. Instead of an alkylbenzene polyethoxy sulfate, an alkylbenzene polyethoxy ethyl sulfonate was used as the solubilizing co-surfactant. The alkylbenzene polyethoxy sulfonate exhibits superior resistance to hydrolysis during long exposures to formations waters, especially in instances where the formation temperature is in excess of 100° F. The solubilizing co-surfactant was prepared by sulfonating a five mole ethylene oxide adduct of nonyl phenol. It was determined that the minimum electrical conductivity resulted when the ratio of solubilizing co-surfactant to petroleum sulfonate was about 0.39. Oil recovery tests confirm that the maximum oil recovery was obtained using a drive fluid containing petroleum sulfonate and the nonyl benzene polyethoxy ethyl sulfonate in the same ratio as produced the minimum electrical conductivity, and using a total surfactant concentration of 2.87.

Once the optimum total concentration of surfactants and weight ratio of solubilizing co-surfactant to primary surfactant are identified as described above, the field procedure is similar to field practices commonly used for surfactant flooding operations. No fresh water preflush is ordinarily needed since the surfactants are tailored to operate optimally at the salinity and divalent ion concentration of the formation water. Sacrificial agents may be used to reduce surfactant adsorption if the particular formation being exploited adsorbs the surfactants being used.

The surfactant fluid is preferably prepared in formation water or field water having salinity and divalent ion concentration about equal to the formation water. The quantity of surfactant fluid utilized will generally be from 0.1 to 1.0 pore volumes based on the pore volumes of formation to be swept by the surfactant fluid. The surfactant fluid should be followed by injection of a mobility buffer, which is an aqueous solution of a hydrophilic polymer such as polyacrylamide or polysaccharide, usually prepared in fresh water. Generally from 50 to 1000 parts per million polymer concentration is sufficient to produce a fluid having a viscosity greater than the formation petroleum viscosity, which is adequate to ensure efficient displacement. Using from 0.1 to 0.6 pore volumes of the viscous mobility buffer solution is adequate. This is in turn followed by injection of field water to displace all of the injected fluids and petroleum through the formations to the production well. Field water injection is continued until the oil cut of the produced fluid drops to an uneconomic level.

Thus, we have disclosed how the optimum weight ratio of solubilizing co-surfactant to primary anionic surfactant such as an organic sulfonate, including a petroleum sulfonate sample, may be determined in simple laboratory tests that are relatively quick and inexpensive to perform. By measuring the electrical conductivity and determining the ratio of surfactants which produces either an inflection point or a minimum value in the conductivity vs. surfactant ratio function, the optimum ratio of surfactants may be determined much more readily than is possible by more conventional means such as by the use of a plurality of core floods employing different surfactant combinations. The method is also useful in field application of the process of our invention, since the concentration ratio of surfactants in the fluid being injected into the formation may be continually or periodically monitored by means of electrical conductivity measurements in order to insure that the surfactants are being mixed and injected in the proper ratio. Monitoring operations may be performed manually or it may be incorporated in automatic mixing equipment to continually maintain the proper balance between the primary anionic surfactant and the solubilizing co-surfactant.

While some discussion of the mechanism and theory of operation of our invention has been included in the foregoing discussion, it was included only for the purpose of additional disclosure and it is not necessarily meant to imply that these are the only or even the primary mechanisms responsible for the proper functioning of our invention. Although we have disclosed our invention in terms of a number of illustrative embodiments, our invention is clearly not so limited since many variations thereof will be apparent to persons skilled in the art of enhanced oil recovery without departing from the true spirit and scope of our invention, and it is our desire and intention that our invention be limited and restricted only by those limitations and restrictions which appear in the claims appended immediately hereinafter below.

We claim:

1. In a method of recovering petroleum from a subterranean, petroleum-containing, permeable formation penetrated by least two wells in fluid communication with the formation, said formation also containing water of known or determinable salinity and divalent ion concentration, comprising injecting an aqueous surfactant-containing fluid into the formation by means of at least one of the wells to displace petroleum toward at least one other well from which it is recovered to the surface of the earth, said surfactant fluid comprising an aqueous fluid having salinity and divalent ion concentration about equal to the formation water, containing an organic sulfonate primary anionic surfactant and at least one solubilizing co-surfactant selected from the group consisting of ethoxylated aliphatic alcohols, ethoxylated alkylphenols, ethoxylated alkylthiols, ethoxylated alkylarylthiols, alkylpolyethoxyalkyl sulfonates having from 8 to 22 carbon atoms in the first alkyl chain and the second alkyl is ethyl, propyl or hydroxypropyl and from 2 to 12 ethoxy groups per molecule, alkylarylpolyethoxyalkyl sulfonates having from 8 to 15 carbon atoms in the first alkyl chain and the second alkyl is ethyl, propyl or hydroxypropyl and from 2 to 12 ethoxy groups per molecule, alkylpolyethoxy sulfates having from 8 to 22 carbon atoms in the alkyl chain and from 2 to 12 ethoxy groups per molecule, alkylarylpolyethoxy sulfates having from 8 to 15 carbon atoms in the alkyl chain and from 2 to 12 ethoxy groups per molecule, wherein the improvement comprises
   (a) identifying the ratio of solubilizing co-surfactant and primary anionic surfactant at which the above mixture of surfactants is borderline soluble in the fluid by a method comprising:
       (1) preparing a series of at least four samples having a total surfactant concentration between 1.0 and 4.0 percent by weight and weight ratios of solubilizing co-surfactant to primary surfactant from 0.1 to 4.0;

(2) measuring the electrical conductivities of the samples creating a graphical plot of electrical conductivity versus weight ratio of solubilizing co-surfactant to organic sulfonate primary anionic surfactant, and identifying the ratio of surfactant concentration corresponding to the first inflection in the function of electrical conductivity versus concentration of solubilizing co-surfactant as the concentration of solubilizing co-surfactant is increased from a value insufficient to render the surfactants soluble in the fluid;

(b) blending the anionic primary surfactant and the solubilizing co-surfactant in a ratio at which they are borderline soluble as determined above.

2. A method as recited in claim 1 wherein the organic sulfonate is selected from the group consisting of petroleum sulfonate, alkyl sulfonate, alkylaryl sulfonate, and mixtures thereof.

3. A method as recited in claim 1 wherein the anionic surfactant is petroleum sulfonate.

4. A method as recited in claim 1 wherein the solubilizing co-surfactant is an alkyl or alkylaryl polyethoxy sulfate.

5. A method as recited in claim 1 wherein the solubilizing co-surfactant has the following structure:

$$R - O - (CH_2CH_2O)_n SO_3^- M^+$$

wherein R is a linear or branched alkyl group having from 8 to 22 carbon atoms or an alkylaryl group having from 8 to 15 carbon atoms in the alkyl chain, $n$ is an integer from 2 to 12 and $M^+$ is a monovalent cation.

6. A method as recited in claim 1 wherein the solubilizing co-surfactant is an alkyl or alkylaryl polyethoxy alkyl sulfonate.

7. A method as recited in claim 6 wherein the solubilizing co-surfactant has the following structure:

$$R - O - (CH_2CH_2O)_n - R' - SO_3 - M^+$$

wherein R is an alkyl group, linear or branched, having from 8 to 22 carbon atoms or an alkylaryl group having from 8 to 15 carbon atoms in the alkyl chain, $n$ is an integer from 2 to 12, R' is ethyl, propyl or hydroxypropyl, and $M^+$ is a monovalent metallic cation.

* * * * *